US007497776B1

(12) United States Patent
Roman

(10) Patent No.: US 7,497,776 B1
(45) Date of Patent: Mar. 3, 2009

(54) MULTIPLAYER GAME MODE WITH PREDATOR FEATURE

(75) Inventor: Jan Andreas Roman, Göteborg (SE)

(73) Assignee: Microsoft Corporation, Redmond, WA (US)

( * ) Notice: Subject to any disclaimer, the term of this patent is extended or adjusted under 35 U.S.C. 154(b) by 1168 days.

(21) Appl. No.: 10/760,471

(22) Filed: Jan. 21, 2004

(51) Int. Cl.
A63F 13/00 (2006.01)

(52) U.S. Cl. .............................. 463/6; 463/42; 463/31; 463/32

(58) Field of Classification Search ............ 463/42, 463/6, 31
See application file for complete search history.

(56) References Cited

U.S. PATENT DOCUMENTS

| 6,117,007 A * | 9/2000 | Matsuyama et al. ............ 463/6 |
| 6,375,568 B1 * | 4/2002 | Roffman et al. .............. 463/26 |
| 6,409,597 B1 * | 6/2002 | Mizumoto ................... 463/31 |
| 6,494,784 B1 * | 12/2002 | Matsuyama et al. ............ 463/6 |
| 2002/0010026 A1 * | 1/2002 | York .......................... 463/47 |

OTHER PUBLICATIONS

"British Bulldog Tage game" dated Nov. 7, 2001.*
Sierra™ "Aliens Versus Predator 2", 2001, pp. 1-73.

* cited by examiner

Primary Examiner—Robert E Pezzuto
Assistant Examiner—Masud Ahmed
(74) Attorney, Agent, or Firm—Workman Nydegger

(57) ABSTRACT

Methods and systems for administering and playing a multi-player computer game are disclosed. During the multi-player computer game, players are either identified as a predator or as prey. The predator players attempt to catch the prey, and the prey-players attempt to evade the predator(s). When a prey is caught, the caught prey becomes an additional predator. During game play, predator players' display screens may display a directional arrow indicating the direction of the closest prey, and may also display a map indicating a position of each remaining prey. Predators may be displayed on each participants display screen with a first graphically depicted appearance (e.g., a police car), while prey may be depicted having a second graphically depicted appearance (e.g., a sports car). The game ends when no prey remain, and the last caught prey is the winner.

36 Claims, 9 Drawing Sheets

MULTIPLAYER GAME MODE WITH PREDATOR FEATURE

FIELD OF THE INVENTION

The invention relates generally to computer games and video games. More specifically, the invention provides a method of administering multiple player games.

BACKGROUND OF THE INVENTION

Computer games, video games, arcade games, and other forms of electronic games have advanced from simple games such as Breakout, Asteroids, and Space Invaders to complex, high-resolution games such as HALO®), published by Microsoft Corporation of Redmond Wash.

Game developers must consistently provide new ideas, dynamic gameplay, or advanced graphics in order to keep game players, also referred to as gamers, interested in new games. In an effort to keep game play dynamic and ever changing, many games offer one or more multi-player options. Traditionally a single multi-player option allowed two players to each play a given game in single-player mode, and the player with the highest score at the end of each player's game wins. As games advanced, multi-player games began to allow players to play the game simultaneously, each controlling a character or event in a common game space or simulated environment. For example, HALO has cooperative multi-player mode, where each player controls a character, and the two players must cooperate to accomplish the game objectives.

Other known multi-player game modes are competitive in nature, while still allowing the players to engage each other in the common game space. For example, first person shooter (FPS) games such as DOOM®, QUAKE®, HALO®, and UNREAL® each have one or more multi-player modes where each player controls a character in the common game space, or simulated environment, while each player attempts to kill (also referred to as 'frag') the other players' characters. These types of multiplayer game modes are typically referred to as 'deathmatch' game modes.

Known multiplayer competitive game modes include the following: Deathmatch (original): Every man for him or herself, and each player tries to frag other players. Players may have a limited or unlimited amount of lives, and the game may have a limited or unlimited amount of time. When lives are limited, the last player still alive wins. When time is limited, the player with the most kills (frags) wins. Yet another variation is where the first player to have a predetermined number of frags wins.

Team Deathmatch Players are divided into two or more teams. Each player tries to frag players on other teams. The team with the most frags at the end of the game wins.

Juggernaut: Similar to Deathmatch, but one player, the juggernaut, has increased weapons and/or defenses. All non-juggernaut players try to kill the juggernaut. When a player kills the juggernaut, that player becomes the new juggernaut and the killed juggernaut becomes a non-juggernaut player. The winner is the player who is the juggernaut for the longest period of time during the game, or the first player to accumulate a predetermined amount of time as the juggernaut.

Capture the Flag: Players are divided into two (or more) teams. Each team has a home base where a team flag is initially placed. Each team attempts to infiltrate the enemy team's home base, capture the enemy flag, and return the enemy team's flag to their own home base. The first team to successfully capture and return the enemy flag wins (variation: the first team to successfully capture the flag n times wins)

King of the Hill: A small portion of the game space is marked as 'the hill'. Each player attempts to control the hill by being the only player located within the hill's boundaries. The first player to control 'the hill' for a predetermined amount of time wins the game (variation: the hill moves periodically during the game).

Other variations of multiplayer games include providing only certain weapons during each game (e.g., only a sniper rifle or only a rocket launcher), or enabling or disabling certain game features (e.g., enabling or disabling a radar screen which indicates locations of enemy movement).

It would be an advancement in the art to provide a new multi-player game mode, and it would be a further advancement in the art to provide a new multi-player game mode for a computer/video game that can be applied to both FPS and non-FPS style games with rich feature enhancements.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to a method for administering and/or playing a multiplayer computer game. According to an aspect of the invention, a computer identifies at least at least one predator and at least one prey, each corresponding to a user participating in the multiplayer computer game. The computer initiates computer game play, during which the at least one predator tries to catch the at least one prey in a graphically depicted simulated environment displayed on a display screen. When any predator of the at least one predator catches any prey of the at least one prey, the computer system changes the caught prey to become an additional predator. The game ends when there is no remaining prey.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
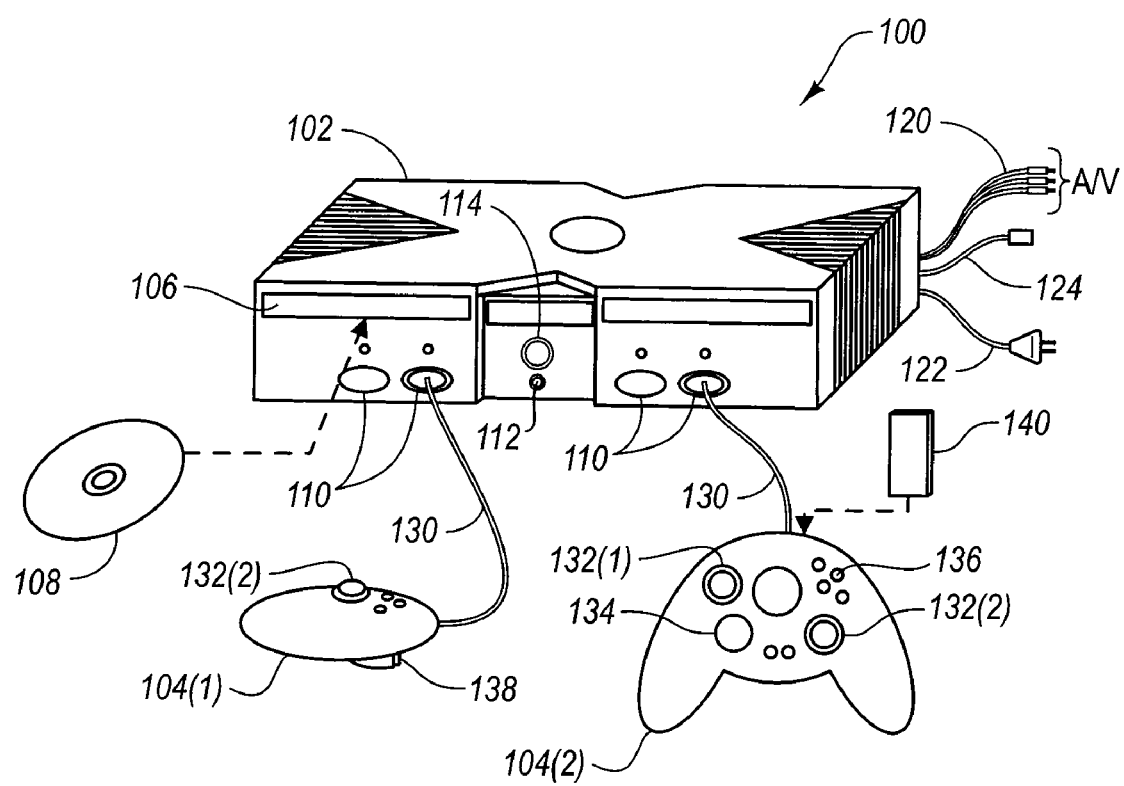
FIG. 1 illustrates a gaming system that may be used according to an illustrative embodiment of the invention.

FIG. 1 illustrates an example of a suitable gaming system environment 100 on which computer games, video games, and or other electronic games (collectively referred to herein as computer games) may be played. The gaming system environment 100 is only one example of a suitable computing environment and is not intended to suggest any limitation as to the scope of use or functionality of the invention. Neither should the gaming system environment 100 be interpreted as having any dependency or requirement relating to any one or combination of components illustrated in the illustrative operating gaming system environment 100.

The invention is operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and up to four controllers, as represented by controllers 104(1) and 104(2).

The game console 102 is equipped with an internal hard disk drive and a portable media drive 106 that supports various forms of portable storage media as represented by optical storage disc 108. Examples of suitable portable storage media include DVD, CD-ROM, game discs, and so forth.

Game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television or other display (not shown) via A/V interfacing cables 120. A power cable 122 provides power to the game console. Game console 102 may further be configured with broadband network capabilities, as represented by the cable or modem connector 124 to facilitate access to a network, such as the Internet.

Each controller 104 may be coupled to the game console 102 via a wire or wireless interface. In the illustrated implementation, the controllers are USB (Universal Serial Bus) compatible and are connected to the console 102 via serial cables 130. Controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and port them for play on other consoles. In the described implementation, each controller is configured to accommodate two memory units 140, although more or less than two units may be employed in other implementations.

Gaming system 100 is capable of playing, for example, games, music, and videos. With the different storage offerings, titles can be played from the hard disk drive or the portable medium 108 in drive 106, from an online source, or from a memory unit 140. A sample of what gaming system 100 is capable of playing include game titles played from CD and DVD discs, from the hard disk drive, or from an online source; digital music played from a CD in the portable media drive 106, from a file on the hard disk drive (e.g., Windows Media Audio (WMA) format), or from online streaming sources; and digital audio/video played from a DVD disc in the portable media drive 106, from a file on the hard disk drive (e.g., Active Streaming Format), or from online streaming sources.

Figure 2:
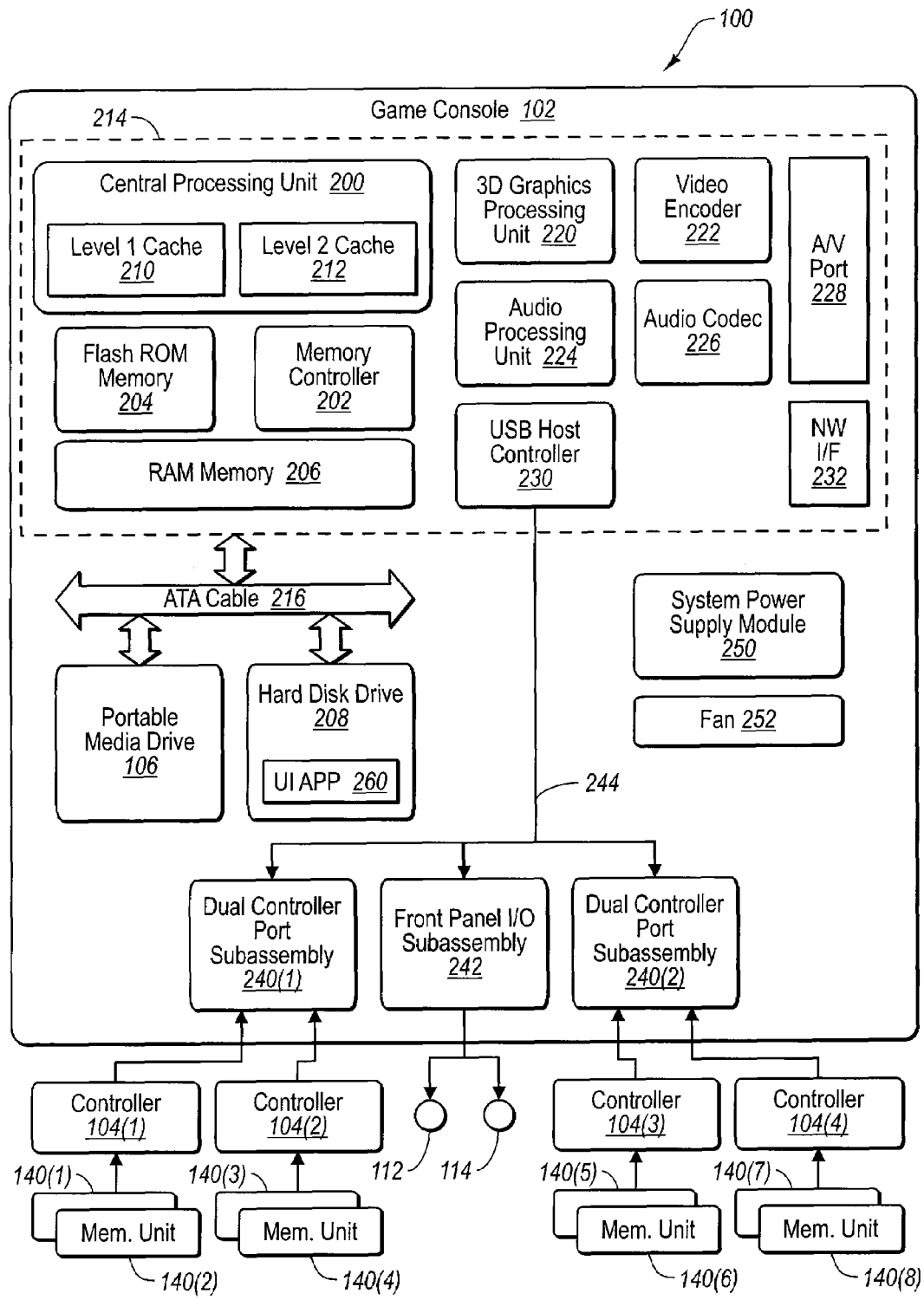
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240 (2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types-game data, audio data, and video data-regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console. The UI application and exemplary screen displays it presents are described below in more detail beneath the headings "Uniform Media Portal" and "Operation".

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
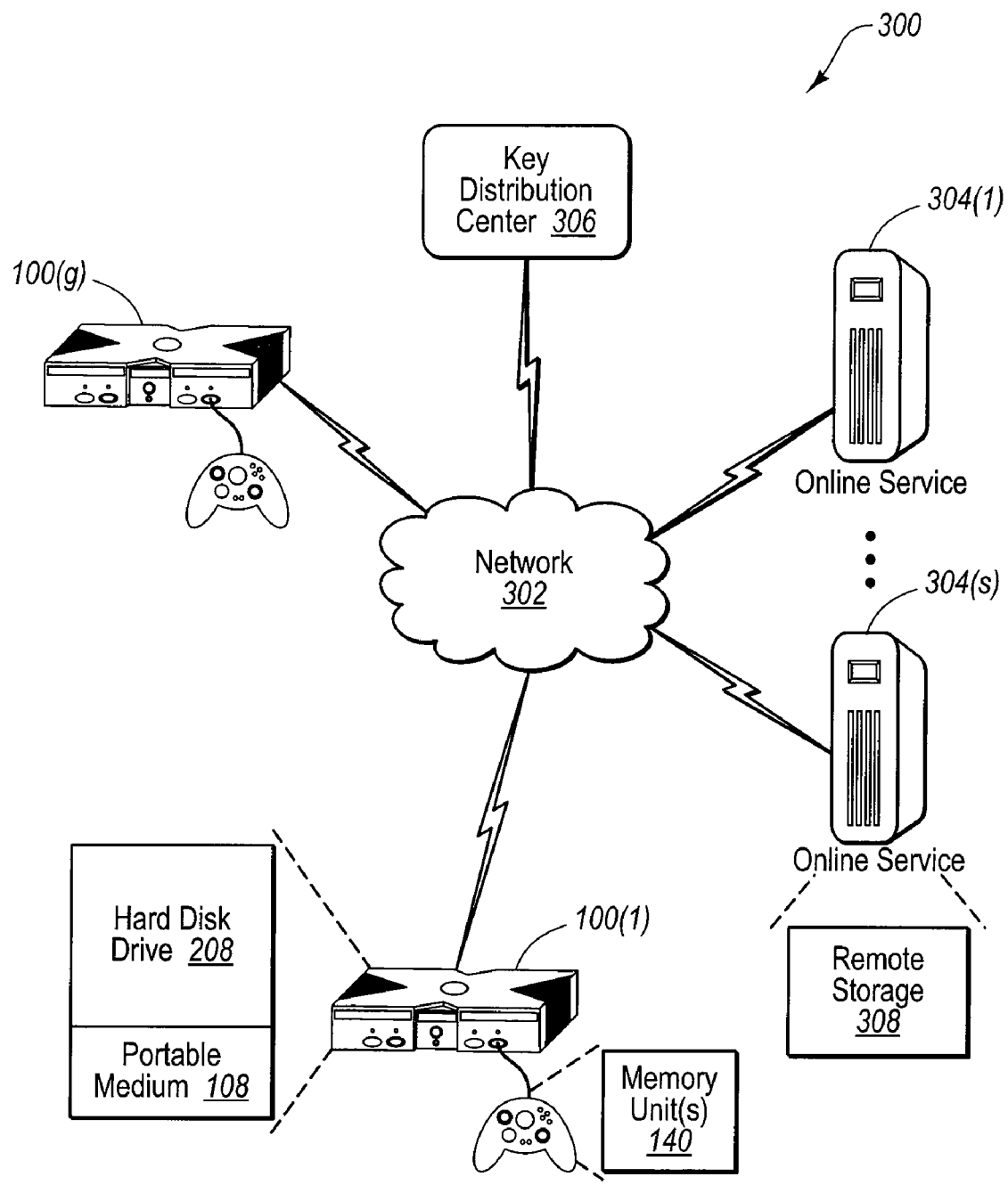
FIG. 3 illustrates a block diagram of a network gaming system.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions.

Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

The uniform media portal model accommodates the network gaming environment. As an example, when a user purchases a game, the model can provide the user with navigation points for downloading upgrades for that game and viewing high scores online specific to the game title.

ILLUSTRATIVE EMBODIMENTS OF THE INVENTION

One or more aspects of the invention may be embodied in computer-executable instructions (i.e., software), such as in a multi-player game administrator software module of a computer game (collectively referred to herein as a multi-player game administrator, or MPGA) stored in RAM memory 206 or any non-volatile memory 108, 208, 308. Generally, software modules include routines, programs, objects, components, data structures, etc. that perform particular tasks or implement particular abstract data types when executed by a processor in a computer or other device. The computer executable instructions may be stored on a computer readable medium such as a hard disk 208, removable storage media 108, solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as integrated circuits, field programmable gate arrays (FPGA), and the like.

Figure 4:
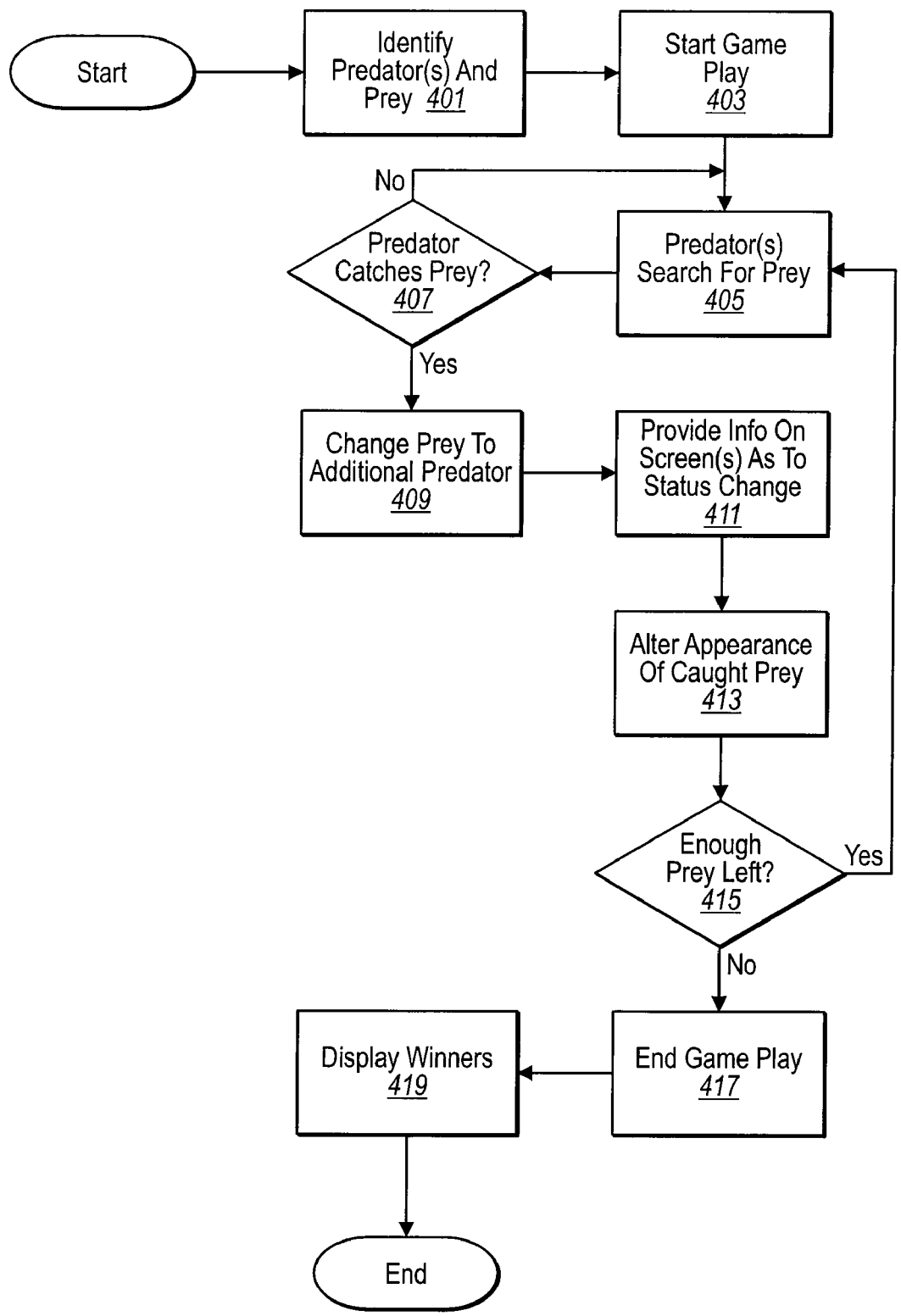
FIG. 4 illustrates a method of playing a multi-player computer game.

FIG. 4 illustrates a method for administrating a multi-player computer game according to one or more aspects of an illustrative embodiment of the present invention. During the multi-player game, players are either identified as a predator or as prey. The predator players attempt to catch the prey-players, and the prey-players attempt to evade or otherwise not be caught by the predator(s). The last remaining prey may be declared the winner of the game, as further described below. It will be appreciated to one of ordinary skill in the art that, while the multiplayer game mode is described in terms of predators and prey for ease of description, the inventive methods and systems are just as applicably described in terms of two teams, where each team competes to convert the other team's players to their own team.

Initially, in step 401, the MPGA identifies the predator(s) and the prey from a predetermined group of players. The predetermined group of players may be identified as a group of players connected to the same game server on gaming network 300, as a group of players who have selected similar gaming options on gaming network 300, or as a group of players whose computers (or other gaming devices) are otherwise interconnected for multi-player game play.

In one illustrative embodiment, one player is identified as the sole initial predator, while the remaining players are identified as prey. In an alternative embodiment, multiple players may start the game as predators. In another alternative embodiment, one player may be identified as a predator for each n players in the predetermined group, e.g., one predator for every ten players. Other values for n may be used. The initial predator(s) may be randomly picked, or may be picked based on some predetermined criteria, e.g., based on a character corresponding to the host user of the game. Alternatively, the user participants may select the initial hunter(s) and prey.

After the predator(s) and prey have been identified, the MPGA starts game play in step 403. During game play (steps 405-415), predators search for and attempt to catch prey, while the prey attempt to avoid predators. In step 405, predators interact with the simulated environment in search of prey. In step 407, the MPGA determines whether a predator has caught one of the prey.

When a prey is caught by a predator, the MPGA identifies the caught prey as a new predator in addition to the preexisting predator(s), in step 409. That is, the caught prey becomes a predator and the predator that caught the prey remains a predator. In step 411, the MPGA may display or cause the gaming system 100 to display a status message to one or more of the players indicating that a player has become an additional predator. In step 413, the MPGA may change or cause to be changed one or more characteristics of the caught prey's graphically depicted appearance.

Next, in step 415, the MPGA determines if there enough remaining prey. In one embodiment of the invention, the game ends when the last prey is caught. In another embodiment, the game may end when only one prey remains or when a predetermined amount of time has elapsed since game play started. If there are enough remaining prey in step 415, the multi-player game mode returns to step 405 where predator (s) continue to attempt to catch prey. If there is not enough remaining prey, game play ends in step 417.

After game play has ended, the MPGA, in step 419, may display or cause to be displayed the winner(s) names on users' displays. In one embodiment of the invention, where the game ends when the last prey is caught, the last caught prey may be declared the winner. In another embodiment, where the game ends when only one prey remains, the last remaining prey may be declared the winner. In yet another embodiment, where the game ends when a predetermined amount of time has elapsed even if all prey have not been caught, all remaining prey may be declared winners. In some embodiments, the predator that caught the most prey during the game may be declared the or an additional winner.

The above method may be applied to any of various types of computer games. In one embodiment of the invention, each player controls an automobile and drives around a graphically depicted virtual city. Predators catch prey by driving their automobiles into prey automobiles. Alternatively, the multi-player game method described in FIG. 4 may be used with first person shooter (FPS) and/or other types of games as well, e.g., bicycling games, skiing games, snowboarding games, in-line skating games, jet-skiing games, flight simulation games, and others. In a flight simulation game, a predator might catch a prey by hitting the prey with a weapon, crashing the predator's plane into the prey's plane, or by destroying the prey's plane. In a first person shooter game, the predator may catch the prey by tagging the prey, hitting the prey with a weapon or ammunition, or by completing some other task that corresponds to the theme of the game, e.g., a vampire (predator) biting a non-vampire (prey), a zombie (predator) touching a human (prey), etc. Regardless of the game theme, the term "catch" as used herein refers to the manner in which a predator turns a prey into an additional predator.

Figure 5:
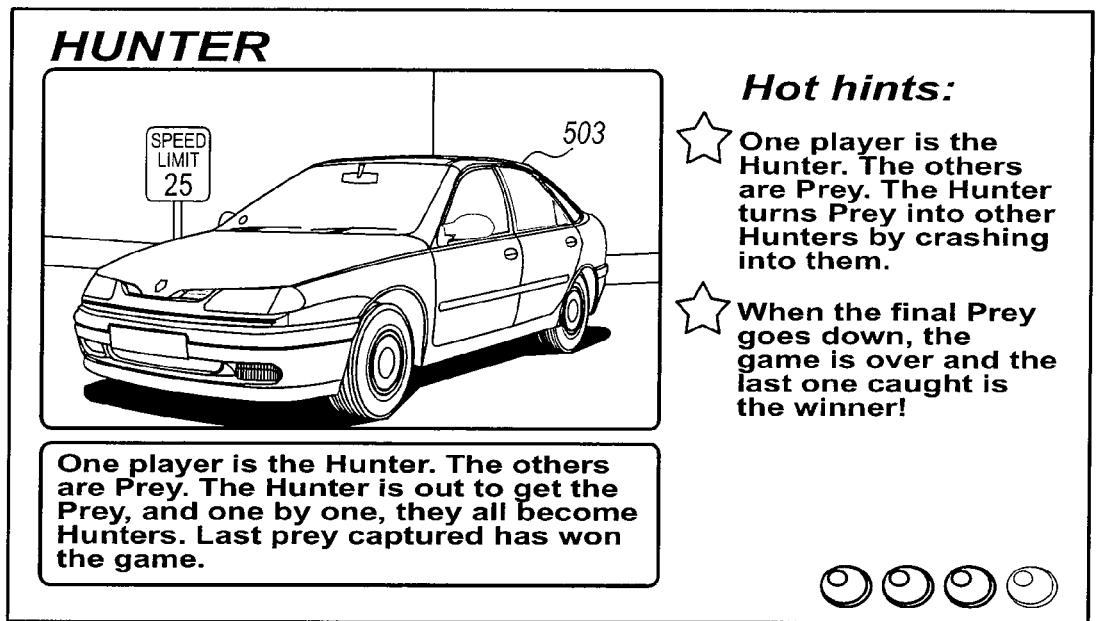
FIG. 5 illustrates a screenshot of a brief instruction screen according to an illustrative embodiment of the invention.

The MPGA may apply any of various modifications and additions to the above method while administering the multi-player game mode. In some embodiments, the MPGA may display an instruction screen 501 to the game participants, such as is illustrated in FIG. 5, prior to starting game play in step 403. This serves to instruct the participants of the general rules of game play, and may be provided by the MPGA while the game is loading or otherwise preparing for game play.

Figure 6:
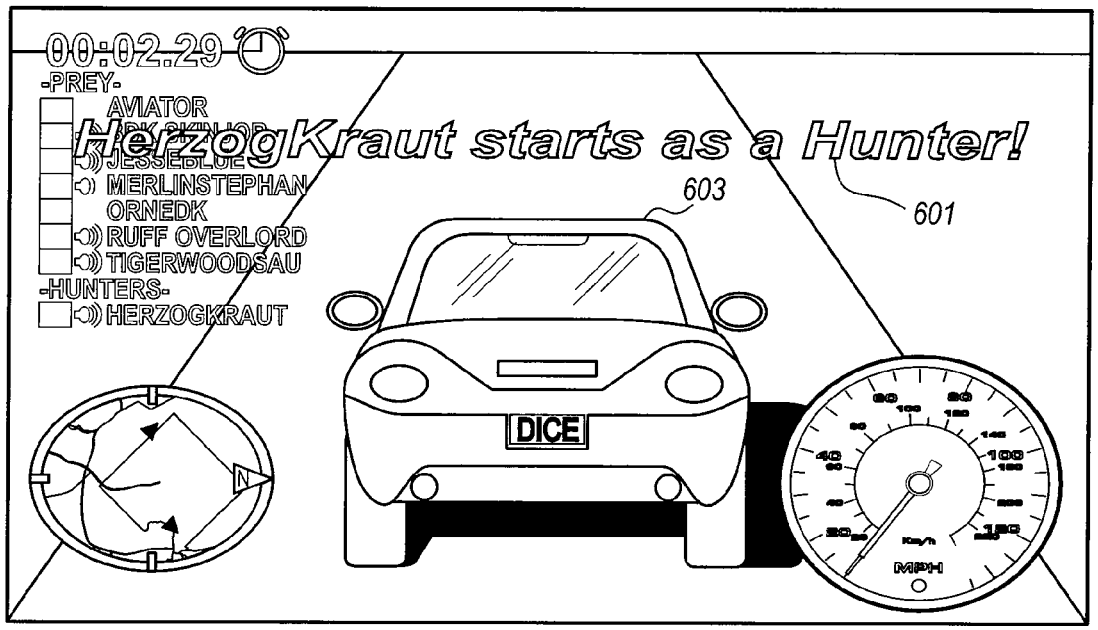
FIG. 6 illustrates a screenshot of a prey as game play is initiated according to an illustrative embodiment of the invention.
Figure 7:
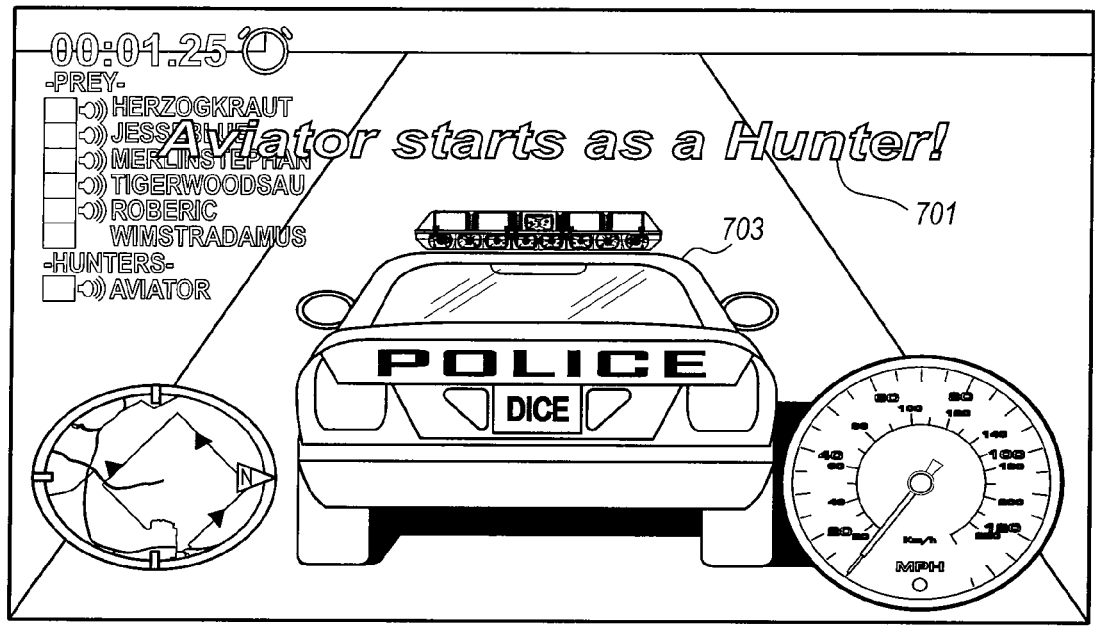
FIG. 7 illustrates a screenshot of a hunter as game play is initiated according to an illustrative embodiment of the invention.
Figure 8:
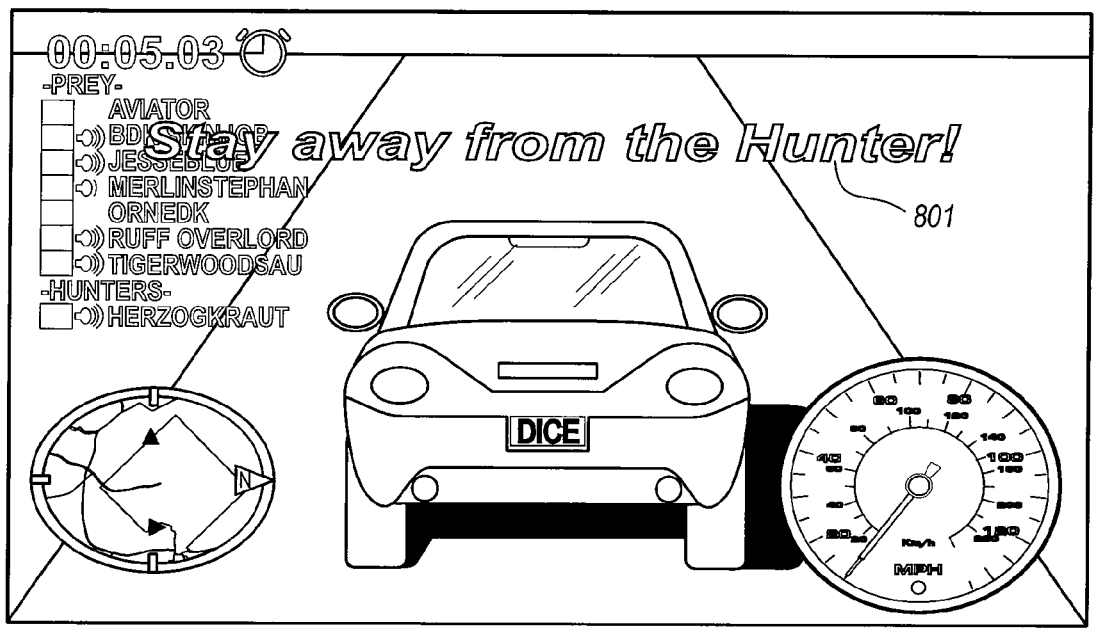
FIG. 8 illustrates a second screenshot of a prey as game play is initiated according to an illustrative embodiment of the invention.
Figure 9:
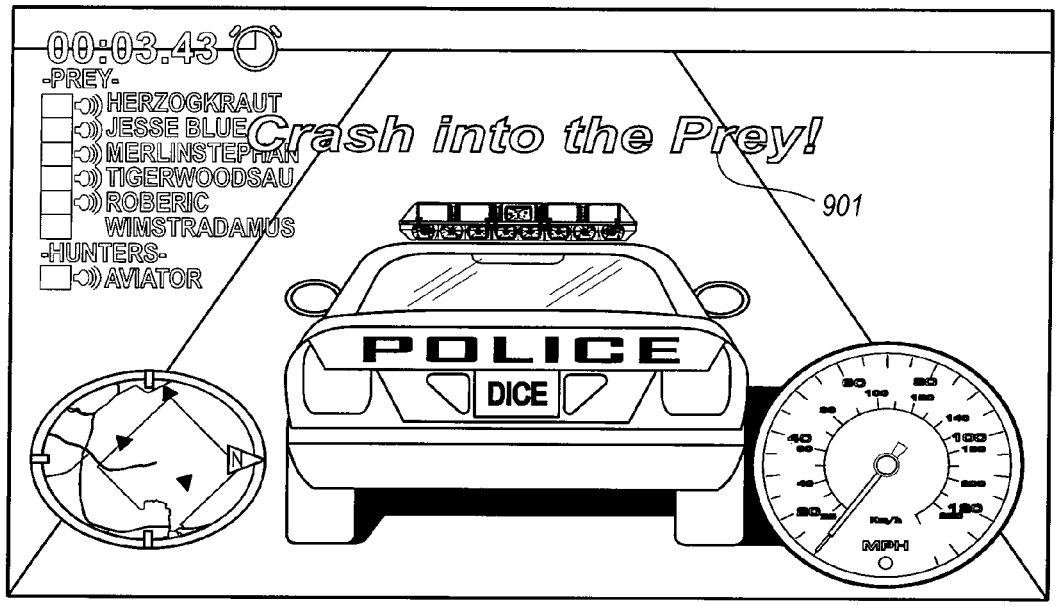
FIG. 9 illustrates a second screenshot of a hunter as game play is initiated according to an illustrative embodiment of the invention.

When game play is about to start or has started, the MPGA may display a message 601, 701 indicating to players who the starting predator(s) is/are, such as is illustrated in FIG. 6 and FIG. 7. The MPGA may also provide one or more instruction messages 801, 901 to participants, illustrated in FIG. 8 and FIG. 9, depending on whether the participant is a prey 603 or a predator 703, respectively, instructing each user how to proceed. For example, the MPGA may instruct the gamer with the GamerTag™ ID "Aviator," who starts as a predator, to crash into prey, as is illustrated in FIG. 9. During game play, predators may have a first graphical depiction, e.g., a police car 703 (FIG. 7), while prey may have a second graphical depiction, e.g., a sports car 503 (FIG. 5), a trendy car, or a slow and/or large automobile (bus, garbage truck, fire engine, etc.) depending on a game difficulty level or other user or game settings. When the prey is caught the MPGA may change or cause to be changed a physical characteristic of the prey's graphically depicted appearance, e.g., changing the prey to appear as a police car to coincide with the prey changing to a predator. Alternatively, the MPGA may change or cause to be changed some other appearance attribute, such as a colored halo, skin color, airplane markings, vehicle markings, clothing, etc.

Figure 10:
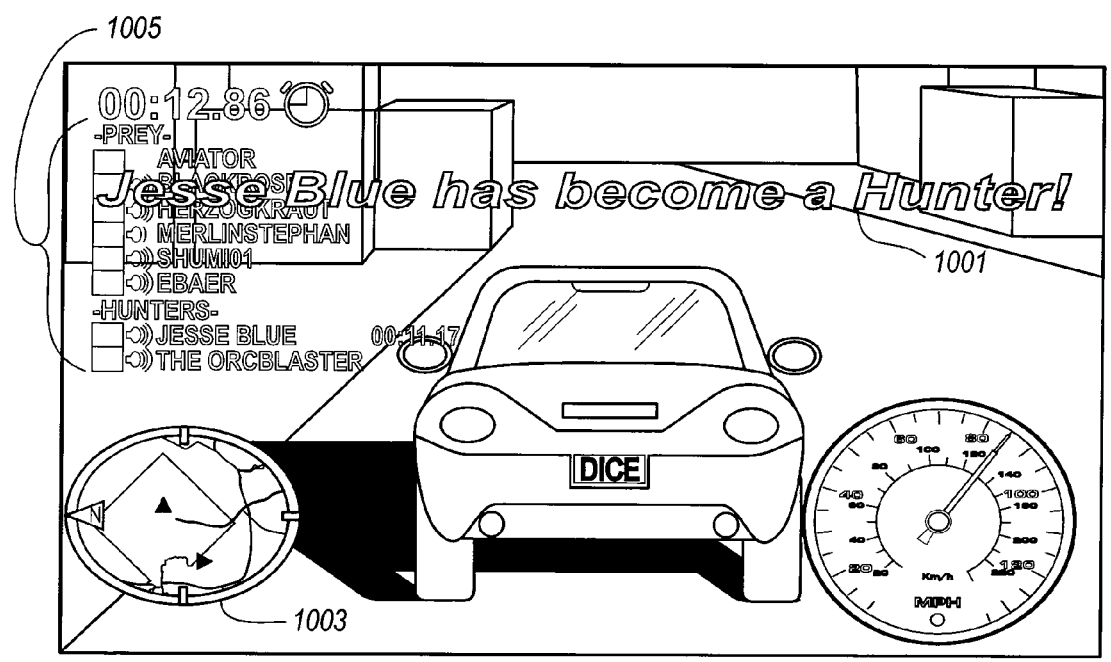
FIG. 10 illustrates a screenshot of a prey during game play according to an illustrative embodiment of the invention.

The MPGA may provide one or more update messages 1001 informing users when prey have been caught and turned into a predator, such as is illustrated in FIG. 10. In addition, the MPGA may display a status list 1005 to each user. The status list 1005 may indicate time elapsed, which players are presently predators, which players are presently prey and, for those players that are predators that started as prey, how long each player evaded the predator(s).

Figure 11:
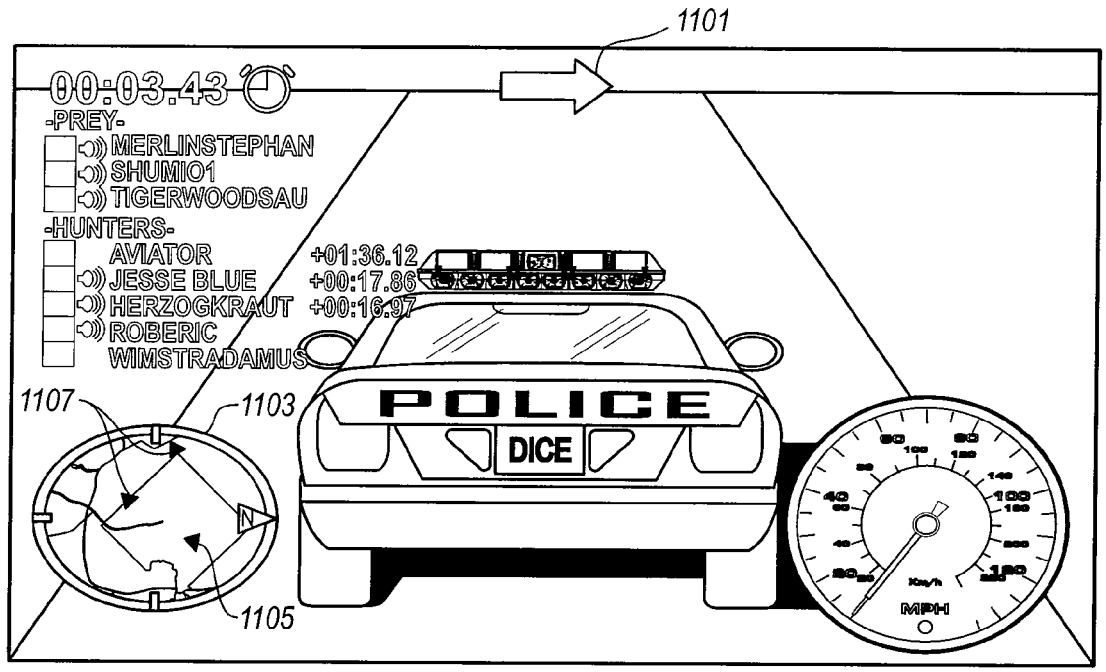
FIG. 11 illustrates a screenshot of a hunter during game play according to an illustrative embodiment of the invention.

The MPGA may provide hunting tools to predators during game play, such as are illustrated in FIG. 11. The MPGA (or any other module within the compute game) may provide a directional arrow 1101 that always points in the direction of the closest prey to the predator's current position in the simulated environment. In addition, the MPGA (or any other module) may provide an on-screen map 1103 indicating the predator's current position 1105 in relation to prey and/or other predator positions 1107.

The MPGA may provide the same or similar tools or prey, depending on whether the MPGA desires to make the game easier for prey or easier for predators, or evenly matched. That is, prey might not receive the directional arrow on their screens, thus making it more difficult to avoid predators. In addition, while characters playing as prey may have an on-screen map 1003 (FIG. 10) as do predators, the prey's on-screen map might only indicate the position of other prey and not indicate the positions of predators. In some embodiments, the MPGA may flash the predators' positions on the on-screen map 1003 only at predetermined intervals. Similar on-screen map characteristics may be used for predators as well, i.e., predators' on-screen maps only display prey at predetermined times or in predetermined intervals.

Prey may also have capabilities that predators do not have. For example, while playing a game where it is nighttime in the simulated environment, prey may be able to turn off the headlights of their respective cars in order to camouflage themselves into the darkness of the simulated environment. Prey may have other camouflage abilities as well, or other camouflage capabilities more particularly suited to other types of the game genres (e.g., camouflage apparel on a graphically depicted character, etc.).

The MPGA may alter predator and prey directional arrows and on-screen maps each game depending on the capabilities of the predator and prey. For example, in an embodiment where the predators and prey are represented by automobiles, the predator may receive more tools than the prey when the prey's automobiles are faster than the predators' automobiles (e.g., predator is police car, prey is Corvette), and the prey may receive more tools than the predators when the predators automobiles are faster than the prey's automobiles (e.g., predator is police car, prey is a garbage truck or bus).

In some embodiments, the predators might always have at least the same capabilities as the fastest/strongest prey. For example, in the above-described embodiment where predators are depicted as police cars and prey are depicted as some other type of automobile, predators' cars might be given the same capabilities as the fastest prey. Thus, if the prey are depicted as and have the in-game capabilities of a sports car, e.g. a Corvette, then the police cars may also be given the ability to drive as fast as the Corvette, while not changing the physical appearance of the predators from police cars to Corvettes. That is, there is no change in appearance of the predators to indicate that the MPGA has enhanced their capabilities, there is only a change in the in-game capabilities and physics to match that of the fastest and/or strongest prey, thus avoiding seemingly endless games where prey can always simply drive, run, fly, swim, ski, etc., faster than the predators.

Depending on the size of the simulated environment, also referred to as a game map, in which the multiplayer game is being played, the game may take longer or shorter amounts of time as players search for and catch each other. In order to speed up game times, the MPGA may use a subset of a preexisting map that is used for another single or multiplayer game type. For example, the MPGA may set the game map size smaller when 5 characters are playing than when 15 characters are playing. In addition, the MPGA might not allow players to hide out in locations in the game map that are otherwise extremely difficult to find. For example, in some simulated environments, the game map might include subways in the city of Paris, France. However, during a game being played according to the multiplayer game mode described herein, the MPGA may cordon off or close the subway areas of the map so that players cannot drive into the subways and "hide out" for an indefinite period of time.

Figure 12:
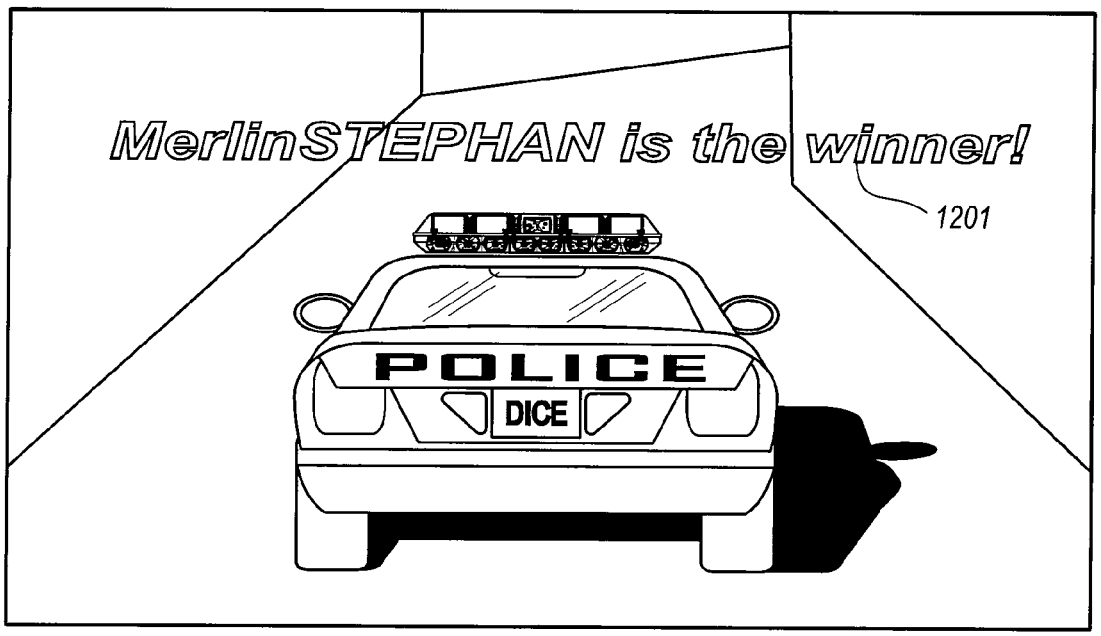
FIG. 12 illustrates a screenshot of a hunter when game play ends according to an illustrative embodiment of the invention.
Figure 13:
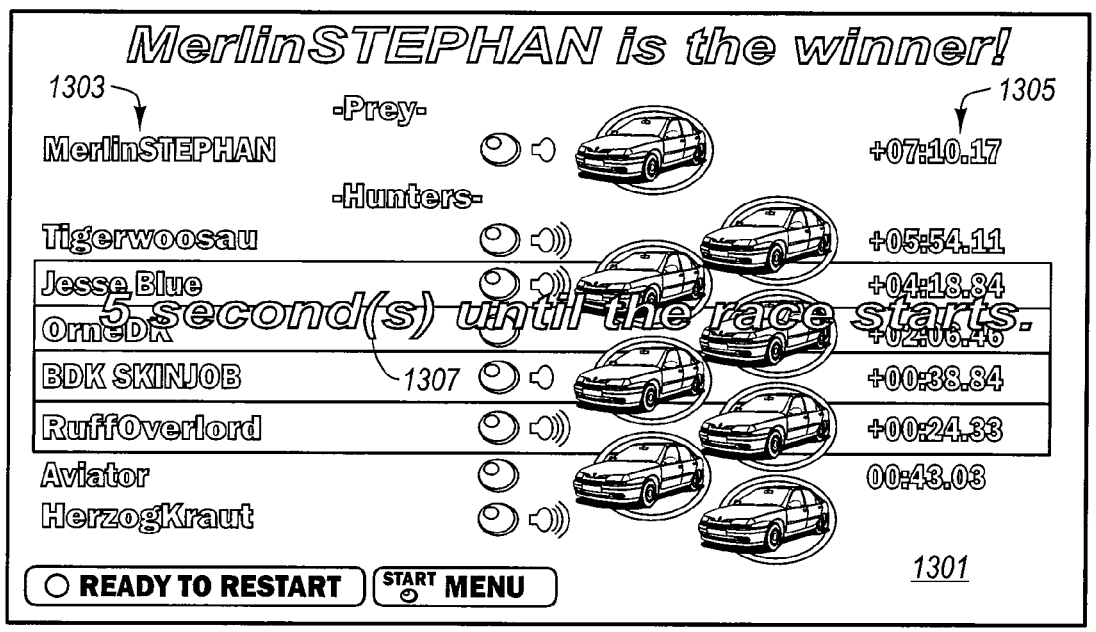
FIG. 13 illustrates a screenshot of a scoreboard according to an illustrative embodiment of the invention.

When the last prey has been caught, the MPGA may display a message 1201 indicating the winner of the game, such as is illustrated in FIG. 12. The MPGA may further display a scoreboard 1301, such as is illustrated in FIG. 13. The scoreboard 1301 may indicate the names of all players in a first column 1303, and their respective scores in a second column 1305. Each player's score may comprise the amount of time that each particular player evaded the predator(s), and the player who evaded the predators the longest (i.e., was the last caught), wins the game. The MPGA may display one or more notice messages 1307 on the scoreboard 1301 indicating to players when the next game will begin.

While the above description describes a general method and some variations for playing a multiplayer game mode, those of skill in the art will appreciate that endless variations are possible while not departing from the genus of the invention. For example, one variation might require multiple catches of prey before the prey is changed to a predator. In another variation, upon the occurrence of the predetermined condition or action, a predator might change back into a prey (e.g., a human prey changes into a zombie predator when touched by the zombie, but can change back to a human upon having a certain spell cast on the character during game play; in a FPS game, shooting a prey by a predator might change the prey into a predator, while shooting a predator by a prey might change the predator into a prey). In still other variations, there may be non-player characters controlled by the MPGA or another module of the computer game. That is, one or more characters (predator and/or prey) may be computer controlled according to artificial intelligence programmed into the computer game.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

What is claimed is:

1. A computer-implemented method for playing a multiplayer computer game comprising an automobile driving simulation, comprising steps of:
   a computer identifying at least one player on a first team and a plurality of players on a second team, each player corresponding to a different automobile in a graphically depicted simulated driving environment in which the multiplayer computer game is played, wherein the at least one player on the first team has at least a first corresponding automobile with a first graphically depicted appearance and all of the players on the second team have automobiles that are graphically distinguished from the at least first corresponding automobile, and wherein each automobile of the at least one player on the first team is given enhanced capabilities so as to always have at least a same speed and capabilities as a fastest and strongest automobile corresponding to all of the plurality of players on the second team and regardless of any type of automobile that is being driven by the at least one player on the first team;

initiating game play, during which each player on the first team tries to catch any player on the second team in the graphically depicted simulated driving environment, wherein a player on the second team is caught when a player on the first team drives the at least first corresponding automobile into an automobile that corresponds to the player on the second team;

when any player on the first team catches any player on the second team by driving the at least first automobile into the automobile corresponding to the player on the second team, reassigning the caught second team player to the first team by at least changing an appearance attribute of the automobile corresponding to the caught second team player to reflect that the second team player is assigned to the first team and such that the automobile corresponding to the caught second team player has a changed graphically depicted appearance that is graphically similar to the first graphically depicted appearance of the at least first corresponding automobile; and ending game play when a predetermined event occurs.

2. The method of claim 1, wherein players on the first team comprise predators, and players on the second team comprise prey.

3. The method of claim 1, wherein each automobile of the at least one player on the first team is faster than all automobiles corresponding to the plurality of players on the second team.

4. The method of claim 1, further comprising:
providing, on the display screens of all players participating in the game, an on-screen graphical display of a status list which is continuously displayed during game play, wherein the graphically displayed status list includes a time elapsed and two listings of players, wherein the first listing is a list of status information of all of the players on the second team and the second listing is a listing of status information of all players on the first team, and wherein the status information of each player comprises a name of the player, an indication of whether each of the players is currently on the first team or the second team, and, for each player that began the game play on the first team and that was subsequently caught and thereby changed to the second team, a duration of time that the player lasted on the first team before being caught;
moving a player from the first listing to the second listing when the player is caught by a member of the first team and thereby reassigned to the first team; and
displaying, next to the caught player that was moved from the first listing to the second listing, the time that the player was on the first team before being caught.

5. The method of claim 1, further comprising:
displaying, temporarily on the display screens of all players participating in the game, when a particular player on the second team has been caught and thereby changed affiliation to the first team, an on-screen graphical indicator indicating a name associated with the particular player that was caught and indicating that the player has become a member of the first team.

6. The method of claim 1, wherein each predator is graphically depicted as a police car.

7. The method of claim 1, further comprising the step of determining a user corresponding to the last player on team two to be a winner of the game.

8. The method of claim 1, wherein at least one player is computer-controlled.

9. The method of claim 1, wherein, upon the occurrence of a predetermined criteria, a player on the first team changes to be a player on the second team.

10. The method of claim 1, further comprising:
sending directional arrow data to a computing system corresponding to a player on the first team, said data defining a direction of a directional arrow displayed on a display screen corresponding to the relative directional location from the player on the first team to a closest player on the second team such that the directional arrow always points in the direction of the closest player on the second team.

11. The method of claim 1, wherein one or more of the players have a visual display of an on-screen map that is depicted in the graphically depicted simulated driving environment during play of the computer game, wherein the on-screen map displays location information of the automobiles of one or more other players of the computer game, the method further comprising:
sending map data to a computing system corresponding to a player identified as a player on the first team, said map data defining a position of each remaining player on the second team, said position of each remaining player on the second team to be displayed on the on-screen map of the player identified as a player on the first team.

12. The method of claim 1, further comprising the step of notifying each remaining player(s) on the second team when any player on the first team catches any player on the second team.

13. The method of claim 1, wherein the predetermined event comprises a predetermined amount of time elapsing.

14. The method of claim 1, wherein the predetermined event comprises a last player on the second team being caught by any player on the first team.

15. The method of claim 1, wherein the computer identifies a plurality of players on the first team prior to initiating game play.

16. The method of claim 1, wherein the computer identifies one player on the first team one for every n total players prior to initiating game play, wherein n is a positive integer.

17. The method of claim 1, further comprising, during game play, continuously providing a graphical display of status list data, wherein the graphically displayed status list data comprises a time elapsed, a name of each of the players, and whether each of the players is currently on the first team or the second team.

18. The method of claim 17, wherein said list data further indicates, for each team one player that started the game as a team two player, how long the each player was a team two player.

19. A computer-readable storage medium comprising stored computer-executable instructions for implementing the method recited in claim 1.

20. The computer-readable medium of claim 19, wherein players on the first team comprise predators, and players on the second team comprise prey.

21. The computer-readable medium of claim 20, wherein each predator is graphically depicted as a police car.

22. The computer-readable medium of claim 19, wherein the computer executable instructions further comprise the step of determining a user corresponding to the last player on team two to be a winner of the game.

23. The computer-readable medium of claim 19, wherein at least one player is computer-controlled.

24. The computer-readable medium of claim 19, wherein, upon the occurrence of a predetermined criteria, a player on the first team changes to be a player on the second team.

25. The computer-readable medium of claim 19, wherein the computer executable instructions further comprise:
   receiving directional arrow data defining a direction of a directional arrow displayed on a display screen corresponding to the relative directional location from a player on the first team to a closest player on the second team.

26. The computer-readable medium of claim 19, wherein the computer executable instructions further comprise:
   receiving map data defining a position of each remaining player on the second team, said position of each remaining player on the second team to be displayed on an on-screen map on a display screen corresponding to any player on the first team.

27. The computer-readable medium of claim 19, wherein the computer executable instructions further comprise the step of notifying each remaining player(s) on the second team when any player on the first team catches any player on the second team.

28. The computer-readable medium of claim 19, wherein the predetermined event comprises a predetermined amount of time elapsing.

29. The computer-readable medium of claim 19, wherein the predetermined event comprises a last player on the second team being caught by any player on the first team.

30. The computer-readable medium of claim 19, wherein the computer identifies a plurality of players on the first team prior to initiating game play.

31. The computer-readable medium of claim 19, wherein the computer identifies one player on the first team one for every n total players prior to initiating game play, wherein n is a positive integer.

32. The computer-readable medium of claim 19, wherein the computer executable instructions further comprise, during game play, providing a graphical display of status list data, the list data comprising a time elapsed, a name of each of the players, and whether each of the players is currently on the first or second team.

33. The computer-readable medium of claim 32, wherein said list data further indicates, for each team one player that started the game as a team two player, how long the each player was a team two player.

34. The method of claim 11, further comprising:
   in addition to sending map data to a computing system corresponding to a player identified as a player on the first team, sending map data to computing systems corresponding to each player on the second team and wherein the on-screen maps of each player on the second team continuously indicate the positions of each player on the second team.

35. The method of claim 34, wherein the on-screen maps of each player on the second team flashes the positions of the at least one player on the first team at periodic intervals.

36. The method of claim 10, wherein the directional arrow data is only provided to some of the players.

* * * * *